United States Patent
Yamasaki et al.

(10) Patent No.: US 9,417,388 B2
(45) Date of Patent: Aug. 16, 2016

(54) SPOT-SIZE CONVERSION OPTICAL WAVEGUIDE

(71) Applicant: FURUKAWA ELECTRIC CO., LTD., Tokyo (JP)

(72) Inventors: Shintaro Yamasaki, Tokyo (JP); Kazutaka Nara, Tokyo (JP); Masanori Takahashi, Tokyo (JP); Yasuyoshi Uchida, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/961,248

(22) Filed: Dec. 7, 2015

(65) Prior Publication Data

US 2016/0085026 A1 Mar. 24, 2016

Related U.S. Application Data

(63) Continuation of application No. PCT/JP2014/056076, filed on Mar. 7, 2014.

(30) Foreign Application Priority Data

Jun. 21, 2013 (JP) .................................. 2013-131068

(51) Int. Cl.
*G02B 6/26* (2006.01)
*G02B 6/122* (2006.01)
(Continued)

(52) U.S. Cl.
CPC ................ *G02B 6/1228* (2013.01); *G02B 6/14* (2013.01); *G02B 6/305* (2013.01)

(58) Field of Classification Search
CPC ........ G02B 6/1228; G02B 6/305; G02B 6/14; G02B 2006/12195; G02B 6/0281; H01S 5/1014; H01S 3/06745

USPC ............................. 385/28, 43, 126, 129, 132
See application file for complete search history.

(56) References Cited

U.S. PATENT DOCUMENTS 6,112,002 A 8/2000 Tabuchi
8,031,991 B2 * 10/2011 Webster ............... G02B 6/1228
385/28
(Continued)

FOREIGN PATENT DOCUMENTS

JP  7-110415     4/1995
JP  2003-167140  6/2003
(Continued)

OTHER PUBLICATIONS

International Search Report issued May 27, 2014 in PCT/JP2014/056076 filed Mar. 7, 2014 (with English translation).
(Continued)

*Primary Examiner* — Ellen Kim
(74) *Attorney, Agent, or Firm* — Oblon, McClelland, Maier & Neustadt, L.L.P.

(57) ABSTRACT

A spot-size-converting optical waveguide includes a core portion. A first core portion of the core portion has a first straight portion and a first tapered portion. The first straight portion extends in a direction, having width and height that are approximately constant in the direction, and the first tapered portion is continuous with the first straight portion and decreases in width and height toward a termination portion. A second core portion of the core portion has a straight-portion-coating portion, a tapered-portion-coating portion, and a second tapered portion, the straight-portion-coating portion covers the first straight portion, the tapered-portion-coating portion covers the first tapered portion continuously with the straight-portion-coating portion and decreases in width and height along the first tapered portion's shape, and the second tapered portion increases in width and height toward the direction. A refractive index of the second core portion is lower than that of the first core portion.

11 Claims, 14 Drawing Sheets

(51) Int. Cl.
*G02B 6/14* (2006.01)
*G02B 6/30* (2006.01)

(56) References Cited

U.S. PATENT DOCUMENTS

| | | | | |
|---|---|---|---|---|
| 8,873,906 | B2 | 10/2014 | Tokushima et al. | |
| 9,279,939 | B2* | 3/2016 | Onishi | G02B 6/305 |
| 2006/0285797 | A1* | 12/2006 | Little | G02B 6/305 385/43 |
| 2010/0040327 | A1* | 2/2010 | Deki | G02B 6/305 385/28 |
| 2011/0205660 | A1* | 8/2011 | Komura | B82Y 20/00 360/59 |
| 2012/0321244 | A1* | 12/2012 | Suzuki | G02B 6/305 385/14 |
| 2013/0266263 | A1* | 10/2013 | Kwon | G02B 6/1228 385/43 |
| 2015/0086153 | A1* | 3/2015 | Ono | G02B 6/1228 385/11 |

FOREIGN PATENT DOCUMENTS

| | | |
|---|---|---|
| JP | 2005-331967 | 12/2005 |
| JP | 2007-93743 | 4/2007 |
| JP | 2011-22464 | 2/2011 |
| JP | 2012-83446 | 4/2012 |

OTHER PUBLICATIONS

Written Opinion issued May 27, 2014 in PCT/JP2014/056076 filed Mar. 7, 2014.

Masatoshi Tokushima, et al., "Dual-Tapered 10-μm-Spot-Size Converter with Double Core for Coupling Polarization-Independent Silicon Rib Waveguides to Single-Mode Optical Fibers", Applied Physics Express 5, 2012, 3 pgs.

* cited by examiner

LENGTH OF ONE SIDE OF LIGHT-OUTPUTTING SURFACE [μm]

INTER-TAPERED-PORTION DISTANCE [μm]

SPOT-SIZE CONVERSION OPTICAL WAVEGUIDE

CROSS-REFERENCE TO RELATED APPLICATION

This application is a continuation of PCT International Application No. PCT/JP2014/056076 filed on Mar. 7, 2014 which claims the benefit of priority from Japanese Patent Application No. 2013-131068 filed on Jun. 21, 2013, the entire contents of which are incorporated herein by reference.

BACKGROUND OF THE INVENTION

1. Field of the Invention

The present invention relates to a spot-size conversion optical waveguide.

2. Description of the Related Art

Both an optical fiber and a planar lightwave circuit (PLC) or the like as an optical waveguide circuit are optical waveguide elements forming a refractive index difference between a core portion and a cladding portion to confine a light within the core portion and making the confined light propagate therethrough. However, in many cases, a relative refractive-index difference $\Delta$ may differ between the optical fiber and the optical waveguide circuit. Therefore, spot sizes of lights propagating through the core portion may differ from each other in many cases. Specifically, a relative refractive-index difference $\Delta$ of an optical waveguide circuit is increased relative to a relative refractive-index difference $\Delta$ of an optical fiber for the purpose of down-sizing or the like sometimes. In a case where relative refractive-index differences $\Delta$ differ between the optical fiber and the optical waveguide circuit, spot sizes of propagating lights differ from each other. In this case, when the optical fiber is connected to the optical waveguide circuit optically in this state, a connection loss is produced in large degree due to mismatching of the spot sizes. In order to restrain such a large degree of connection loss from being produced, a spot-size conversion optical waveguide is disclosed which is disposed at a position where the optical fiber is connected to the optical waveguide circuit to convert the spot size of a light (for example, see Japanese Patent Application Laid-open Publication No. 2007-093743, Japanese Patent Application Laid-open Publication No. 2011-022464 and Tokushima et al., "Dual-Tapered 10-µm-Spot-Size Converter with Double Core for Coupling Polarization-Independent Silicon Rib Waveguides to Single-Mode Optical Fibers", Applied Physics Express 5 (2012) 022202). A spot-size conversion optical waveguide as such is used as well in a case of connecting optical waveguide circuits of which spot sizes of lights differ from each other.

SUMMARY OF THE INVENTION

It is an object of the present invention to at least partially solve the problems in the conventional technology.

In accordance with one aspect of the present invention, a spot-size-converting optical waveguide includes a cladding portion and a core portion disposed in the cladding portion. A refractive index of the core portion is higher than a refractive index of the cladding portion. The core portion includes a first core portion and a second core portion. The first core portion has a first straight portion and a first tapered portion. The first straight portion extends in a predetermined direction and has width and height that are approximately constant in the extension direction, and the first tapered portion is formed to be continuous with the first straight portion and decreases in width and height toward a termination portion. The second core portion has a straight-portion-coating portion, a tapered-portion-coating portion, and a second tapered portion, the straight-portion-coating portion is formed to cover the first straight portion of the first core portion, the tapered-portion-coating portion is formed to cover the first tapered portion of the first core portion continuously with the straight-portion-coating portion and decreases in width and height along a shape of the first tapered portion, and the second tapered portion increases in width and height toward the extension direction. A light-outputting surface is formed at an end portion of the second core portion, and a refractive index of the second core portion is lower than a refractive index of the first core portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
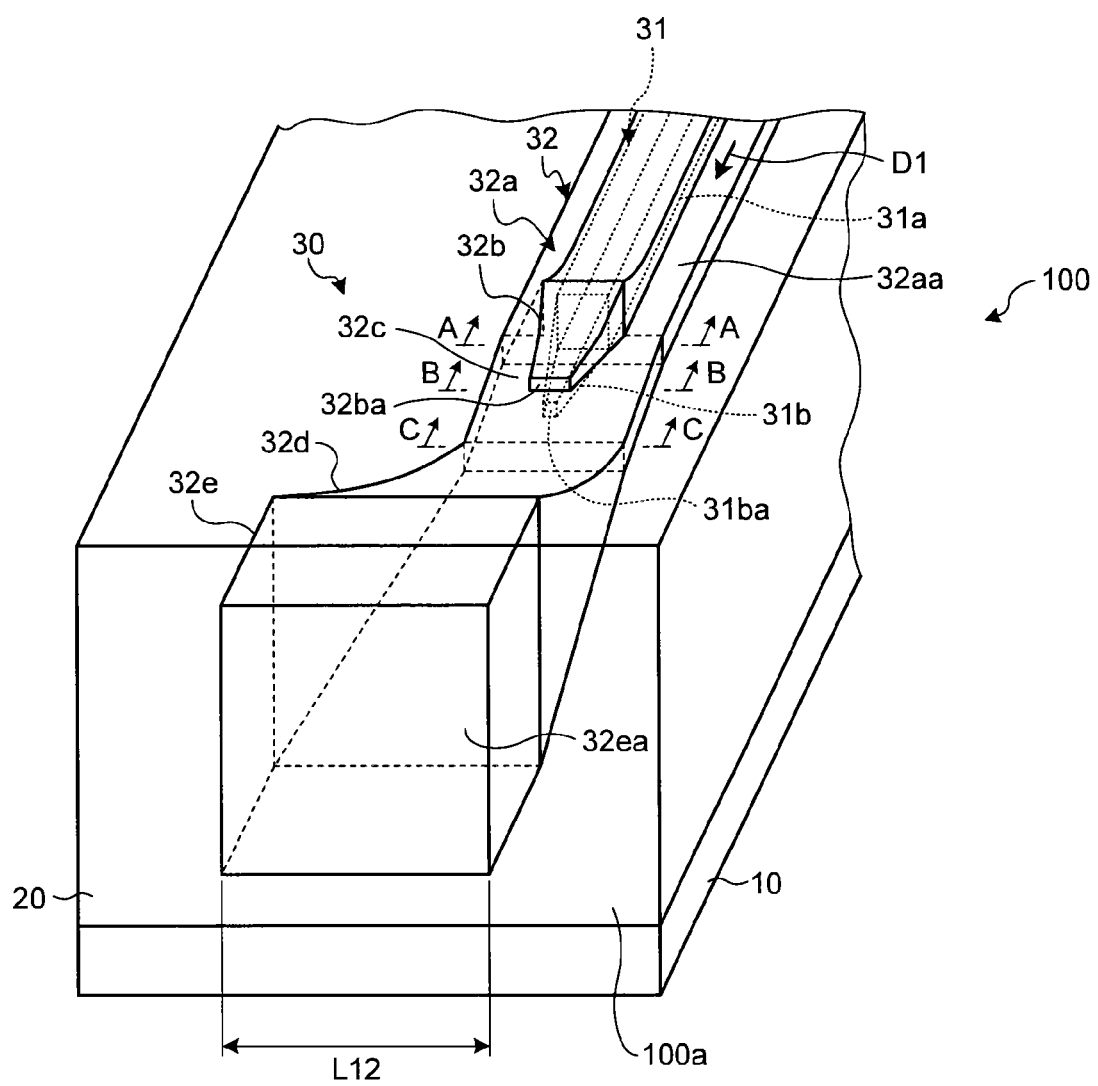
FIG. 1 is a schematic perspective view of a spot-size conversion optical waveguide according to Embodiment 1.

Hereafter, embodiments of a spot-size conversion optical waveguide according to the present invention will be explained in detail with reference to the drawings. The present invention is not limited to these embodiments. In all the drawings, identical or corresponding elements are given same reference numerals appropriately. Moreover, it should be noted that the drawings show schematic examples. Accordingly, a relationship between respective elements may be different from real values. Among the drawings, there may be parts where the relationships and ratios of the shown sizes are different from one another.

Spot-size conversion optical waveguides are required to reduce connection loss between optical waveguide elements which should be connected optically.

According to the embodiment described below, an effect capable of providing a spot-size conversion optical waveguide capable of reducing connection loss is obtained.

Embodiment 1

Figure 2:
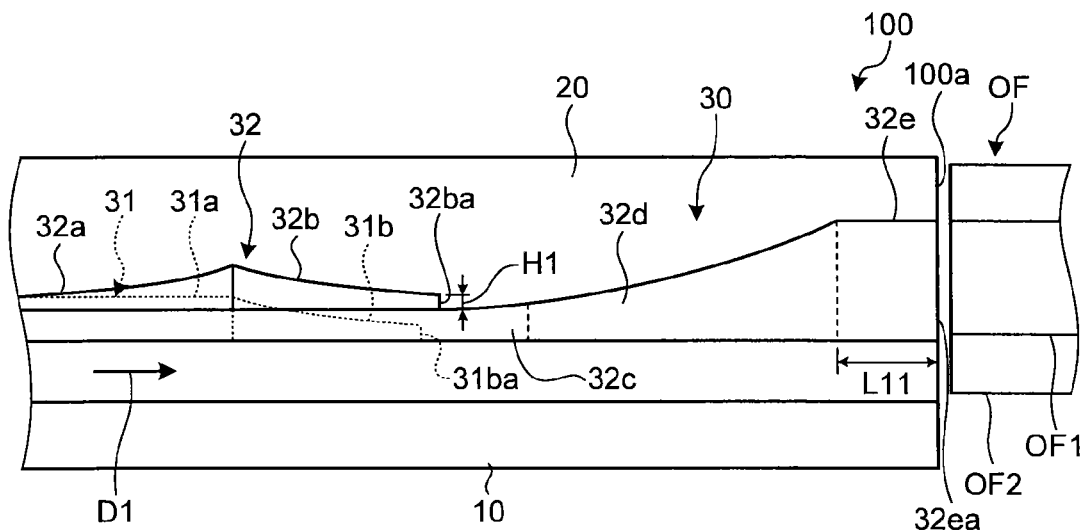
FIG. 2 is a schematic side view of the spot-size conversion optical waveguide shown in FIG. 1.
Figure 3:
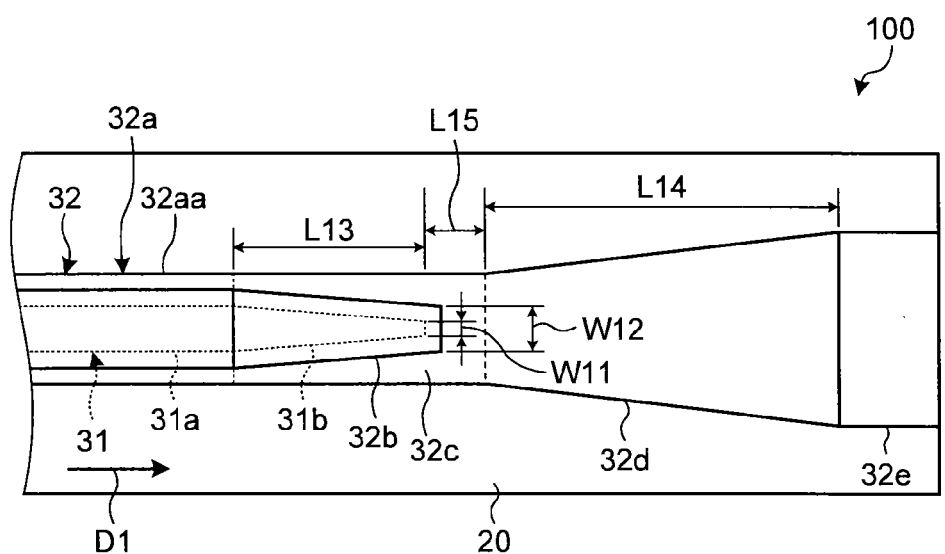
FIG. 3 is a schematic plan view of the spot-size conversion optical waveguide shown in FIG. 1.

FIG. 1 is a schematic perspective view of a spot-size conversion optical waveguide according to Embodiment 1 of the present invention. FIG. 2 is a schematic side view of the spot-size conversion optical waveguide shown in FIG. 1. FIG. 3 is a schematic plan view of the spot-size conversion optical waveguide shown in FIG. 1. As shown in FIG. 1 to FIG. 3, a spot-size conversion optical waveguide 100 according to present Embodiment 1 includes a substrate 10, a cladding portion 20 formed on the substrate 10, and a core portion 30 disposed in the cladding portion 20. The core portion 30 extends in a direction D1.

The substrate 10 is made of, for example, silicon. The cladding portion 20 is made of, for example, silica-based glass which is doped with oxide such as boron (B) and phosphor (P).

The core portion 30 is made of silica-based glass of which refractive index is set to be higher than that of the cladding portion 20. The core portion 30 has a first core portion 31 and a second core portion 32 of which refractive index is lower than that of the first core portion 31.

Configurations of the first core portion 31 and the second core portion 32 will be explained more specifically. The first core portion 31 has a first straight portion 31a and a first tapered portion 31b. The first straight portion 31a extends in the direction D1 (extension direction). A cross section of the first straight portion 31a in a plane which is orthogonal to the extension direction is, for example, square-shaped, and its width and height are approximately constant in the extension direction. The first tapered portion 31b is formed to be continuous with the first straight portion 31a, and a cross section of the first tapered portion 31b is, for example, square-shaped. The first tapered portion 31b is reduced in its width and height toward a termination portion 31ba like a tapered-shape. The first tapered portion 31b has a length L13 (see FIG. 3). It is not necessary that the width and the height be reduced simultaneously, for example, the height may be reduced at first and then the width may be reduced. However, from a view point of down-sizing, it is preferable that the width and the height be reduced simultaneously. The first core portion 31 is made of silica-based glass which is doped with oxide, as a refractive-index-increasing material, of zirconium (Zr), hafnium (Hf), titanium (Ti), tantalum (Ta), niobium (Nb), aluminum (Al) or the like. A relative refractive-index difference of the first core portion 31 relative to the cladding portion 20 is, for example, 2.5% to 12%, and more preferably 4% to 12%.

The second core portion 32 has a straight-portion-coating portion 32a, a tapered-portion-coating portion 32b, a second tapered portion 32d, a second straight portion 32e, and a coupling portion 32c coupling the tapered-portion-coating portion 32b to the second tapered portion 32d. Moreover, the second core portion 32 has a side portion 32aa expanding in a width direction of the straight-portion-coating portion 32a. The second core portion 32 is made of silica-based glass which is doped with oxide as, for example, refractive-index-increasing material such as germanium (Ge). A relative refractive-index difference of the second core portion 32 relative to the cladding portion 20 is, for example, 0.3% to 1.8%.

The straight-portion-coating portion 32a is formed to cover the first straight portion 31a of the first core portion 31 from thereabove. The height of the straight-portion-coating portion 32a decreases gradually toward an opposite side of the direction D1. The tapered-portion-coating portion 32b is continuous with the straight-portion-coating portion 32a and is formed to cover the first tapered portion 31b of the first core portion 31. The width and height of the tapered-portion-coating portion 32b decease like a tapered-shape along the shape of the first tapered portion 31b. The tapered-portion-coating portion 32b has a length which is equal to or longer than at least the length L13 of the first tapered portion 31b (see FIG. 3). A termination portion 32ba corresponding to the termination portion 31ba of the first tapered portion 31b is formed at a termination portion of the tapered-portion-coating portion 32b. The second tapered portion 32d extends in width and height like a tapered-shape toward the direction D1. The second tapered portion 32d has length L14 (see FIG. 3). The termination portion 31ba of the first tapered portion 31b is separated from the second tapered portion 32d by a distance L15.

The second straight portion 32e is formed to be continuous with the second tapered portion 32d. A cross section at a plane which is orthogonal to the direction D1 is, for example, square-shaped, and width and height thereof are approximately constant in the direction D1. A light-outputting surface 32ea is formed at an end portion of the second straight portion 32e. The second straight portion 32e has a length L11 (see FIG. 2). The light-outputting surface 32ea is disposed on a plane that is the same as the end surface 100a of the spot-size conversion optical waveguide 100. The cross section of the second straight portion 32e and the light-outputting surface 32ea are square-shaped of which length of one side is, for example, a length L12 (see FIG. 1). Although the second straight portion 32e is not always necessary, for obtaining a desirable size of the light-outputting surface 32ea stably, it is preferable to provide the second straight portion 32e. In a case where no second straight portion 32e is provided, an end surface formed at an end portion of the second tapered portion 32d is positioned on a plane that is the same as the end surface 100a of the spot-size conversion optical waveguide 100 to be a light-outputting surface. The coupling portion 32c expands to a side portion of the tapered-portion-coating portion 32b and to a side of the second tapered portion 32d. In the spot-size conversion optical waveguide 100 according to present Embodiment 1, the coupling portion 32c is formed to connect an interval between the side portion 32aa and the second tapered portion 32d as well.

Figure 4A:
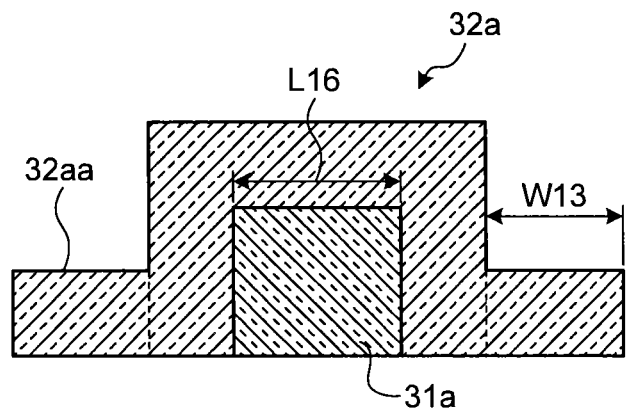
FIG. 4A is a view showing surfaces of a first core portion and a second core portion at a cross section viewed from line A-A shown in FIG. 1.
Figure 4B:
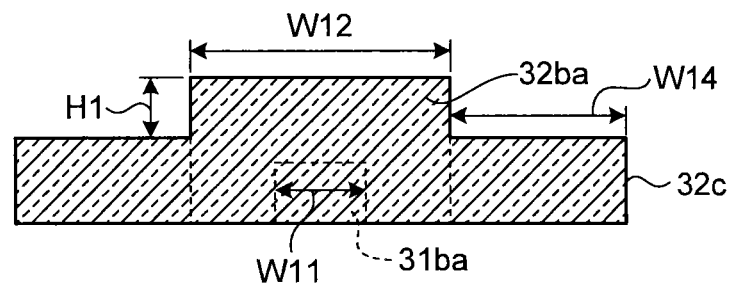
FIG. 4B is a view showing surfaces of the first core portion and the second core portion at a cross section viewed from line B-B shown in FIG. 1.
Figure 4C:
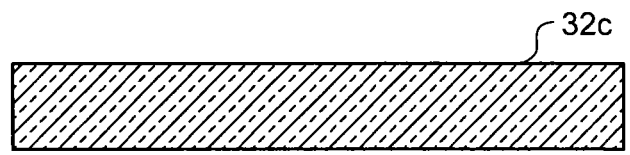
FIG. 4C is a view showing surfaces of the first core portion and the second core portion at a cross section viewed from line C-C shown in FIG. 1.

FIGS. 4A, 4B, and 4C are views showing surfaces of cross sections of the first core portion 31 and the second core portion 32 at cross sectional views taken from lines A-A, B-B, and C-C shown in FIG. 1 respectively. As shown in FIG. 4A, an end portion of the first straight portion 31a of the first core portion 31 appears at the cross section viewed from line A-A. The straight-portion-coating portion 32a, of the second core portion 32, formed to cover the first straight portion 31a, and the side portion 32aa expanding in the width direction of the straight-portion-coating portion 32a appear. The first straight portion 31a has a square-shaped cross section of which length of one side is length L16. The side portion 32aa has a width W13.

From the cross section viewed from line A-A to the cross section viewed from line B-B, as shown in FIG. 1 as well, the width and height of the square of the first tapered portion 31b of the first core portion 31 decrease toward the termination portion 31ba. The tapered-portion-coating portion 32b of the second core portion 32 covers the first tapered portion 31b. The width and height of the tapered-portion-coating portion 32b decrease along the shape of the first tapered portion 31b. As shown in FIG. 4B, the termination portion 32ba of the tapered-portion-coating portion 32b and the coupling portion 32c of the second core portion 32 appear at the cross section viewed from line B-B. The first core portion 31 is indicated by a broken line since the termination portion 31ba of the first tapered portion 31b is positioned at a side of the cross section viewed from line A-A relative to the cross section viewed from line B-B. The termination portion 31ba has a width W11. The termination portion 32ba has a width W12. The termination portion 32ba is formed as a gap H1 to the coupling portion 32c. The coupling portion 32c is wider than the tapered-portion-coating portion 32b by a width W14. The width W14 increases in its value from the cross section viewed from line A-A to the cross section viewed from line B-B.

From the cross section viewed from line B-B to the cross section viewed from line C-C, as shown in FIG. 1 as well, the first core portion 31 does not exist, and the coupling portion 32c of the second core portion 32 extends in the direction D1 so that the coupling portion 32c has a rectangular cross sectional shape. As shown in FIG. 4C, only the coupling portion 32c of the second core portion 32 appears at the cross section viewed from line C-C.

Hereafter, a method of using the spot-size conversion optical waveguide 100 according to present Embodiment 1 and operation thereof will be explained. In this spot-size conversion optical waveguide 100, an optical waveguide circuit is connected to a side of the first straight portion 31a of the first core portion 31. As shown in FIG. 2, an optical fiber OF is disposed so that an end surface of the optical fiber OF faces the light-outputting surface 32ea which is on a plane that is the same as the end surface 100a of the spot-size conversion optical waveguide 100. The optical fiber OF has a core portion OF1 and a cladding portion OF2. The optical fiber OF is, for example, a standard single-mode optical fiber for standard use in an optical communication field conforming to International Telecommunication Union (ITU-T) G.652.

An optical signal having a wavelength included in a wavelength band, within a range of 1520 nm to 1620 nm, for use in, for example, optical communication is input into the first core portion 31 from the side of the optical waveguide circuit. A length L16 as a length of one side of the first core portion 31 and a relative refractive-index difference therefor are set so that the first core portion 31 is subjected to an optical connection with the optical waveguide circuit at a low loss. Therefore, loss is small when the signal light is input from the optical waveguide circuit to the spot-size conversion optical waveguide 100.

The first core portion 31 propagates the optical signal inputted at first to the first straight portion 31a in the direction D1. The length L16, as the length of one side of the first straight portion 31a, is set at a length to a degree capable of propagating an input predetermined wavelength of optical signal at a single-mode. In a case where the relative refractive-index difference of the first core portion 31 is 4% to 12% and the wavelength of the signal light is within a range of 1520 nm to 1620 nm, the length L16 is, for example, 1.5 µm to 3.0 µm. It is preferable that the length L16 be set in accordance with the wavelength of the optical signal and the relative refractive-index difference of the first core portion 31.

The first core portion 31 propagates an optical signal subsequently input to the first tapered portion 31b. The first tapered portion 31b decreases in its width and height. Therefore, a field of propagating light expands to the tapered-portion-coating portion 32b of the second core portion 32 gradually while being propagated through the first tapered portion 31b. The width and height of the tapered-portion-coating portion 32b are greater than the width and height of the first tapered portion 31b of the first core portion 31. It is preferable that the width and height of the tapered-portion-coating portion 32b make an signal light propagate at a single-mode through a portion including the first tapered portion 31b and the tapered-portion-coating portion 32b of the core portion 30. In a case where the relative refractive-index difference of the first core portion 31 is 4% to 12%, the relative refractive-index difference of the second core portion 32 is 0.3% to 1.8%, and the wavelength of the signal light is range of 1520 nm to 1620 nm, it is preferable that the width and height of the tapered-portion-coating portion 32b be greater than the width and height of the first tapered portion 31b and, for example, equal to or lower than 10 µm.

Although the first tapered portion 31b does not exist in the direction D1 relative to the termination portion 31ba, the power of the signal light propagating through the first tapered portion 31b transmits to the coupling portion 32c of the second core portion 32 with low loss via the tapered-portion-coating portion 32 by making the length L13 of the first tapered portion 31b be of an adequate value. If the width W14 by which the coupling portion 32c expands relative to the tapered-portion-coating portion 32b is within a range of 0 µm to 2 μm, the power of the signal light can be transmitted with lower loss since the spot size is prevented from being deformed when transmitting the power of the signal light.

The coupling portion 32c propagates the signal light having been propagated through the first tapered portion 31b to the second tapered portion 32d. After that, since the second tapered portion 32d expands in the width and height toward the direction D1, the second tapered portion 32d propagates the signal light to the second straight portion 32e while expanding its spot size. The second straight portion 32e propagates the signal light of which spot size is expanded to an appropriate size and outputs the signal light from the light-outputting surface 32ea. The spot size of the signal light output from the light-outputting surface 32ea is converted to a spot size that is capable of optical coupling to the optical fiber OF with low loss. Therefore, the loss is low when the signal light is input from the spot-size conversion optical waveguide 100 to the optical fiber OF.

As described above, the spot-size conversion optical waveguide 100 is capable of coupling the signal light input from the optical waveguide circuit to the optical fiber OF optically with low connection loss.

Particularly, the spot-size conversion optical waveguide 100, which is capable of coupling the signal light input from the optical waveguide circuit with low connection loss optically even if the first core portion 31 has such high relative refractive-index difference, exerts a particularly great effect.

Embodiment 2

Figure 5:
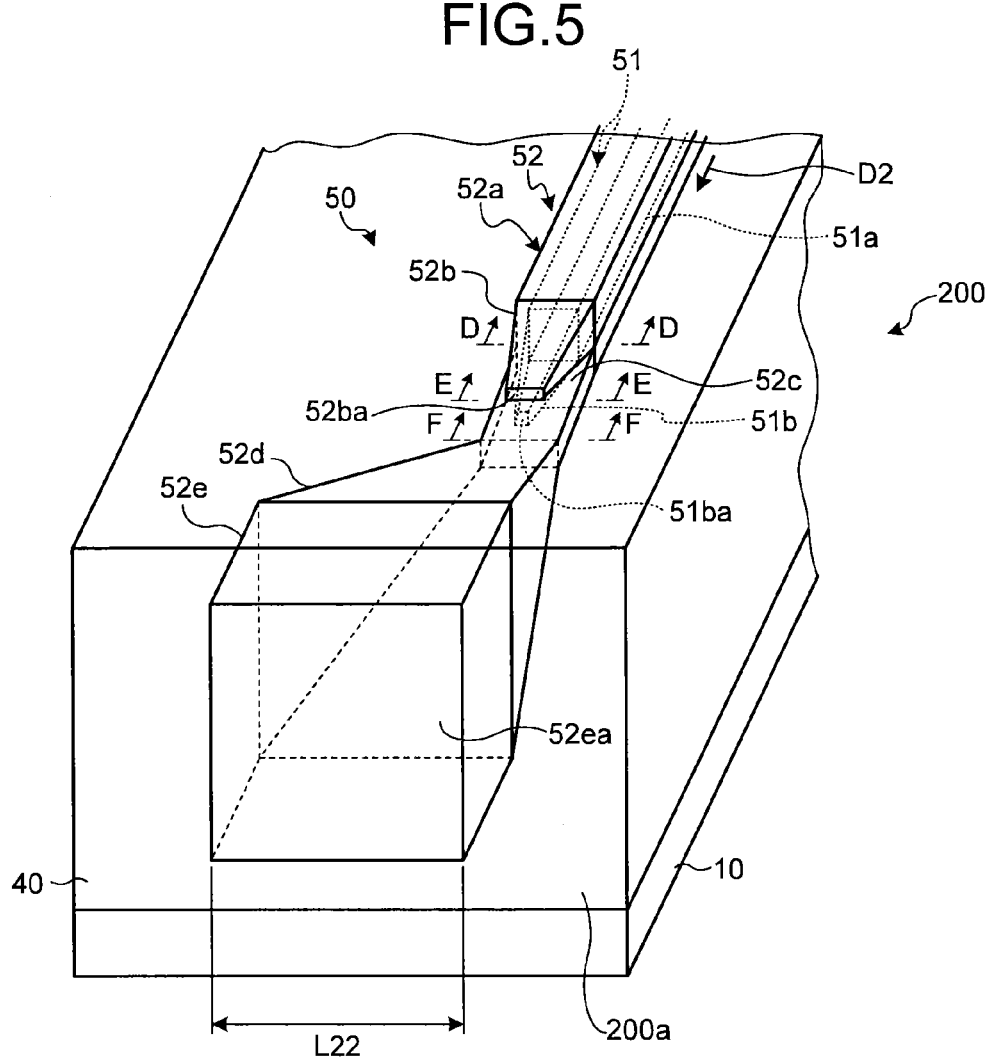
FIG. 5 is a schematic perspective view of a spot-size conversion optical waveguide according to Embodiment 2.
Figure 6:
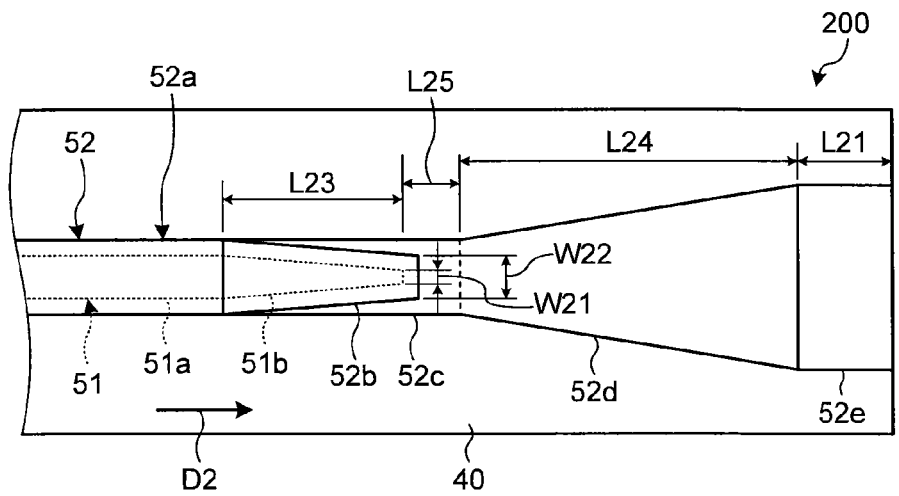
FIG. 6 is a schematic plan view of the spot-size conversion optical waveguide shown in FIG. 5.

FIG. 5 is a schematic perspective view of a spot-size conversion optical waveguide according to Embodiment 2. FIG. 6 is a schematic plan view of the spot-size conversion optical waveguide shown in FIG. 5. As shown in FIGS. 5 and 6, a spot-size conversion optical waveguide 200 according to present Embodiment 2 includes the substrate 10, a cladding portion 40 formed on the substrate 10, and a core portion 50 disposed in the cladding portion 40. The core portion 50 extends in a direction D2.

The substrate 10 is the same as the substrate 10 of the spot-size conversion optical waveguide 100 according to Embodiment 1. Similarly to the cladding portion 20 of the spot-size conversion optical waveguide 100, the cladding portion 40 is made of silica-based glass which is doped with oxide such as boron (B) and phosphor (P).

Similarly to the core portion 30 of the spot-size conversion optical waveguide 100, the core portion 50 is made of silica-based glass of which refractive index is set to be higher than that of the cladding portion 40. The core portion 50 has a first core portion 51, and a second core portion 52 of which refractive index is lower than that of the first core portion 51.

similarly to the first core portion 31 of the spot-size conversion optical waveguide 100, the first core portion 51 has a first straight portion 51a and a first tapered portion 51b. The first straight portion 51a extends in the direction D2 (extension direction). A cross section at a plane orthogonal to the extension direction is, for example, square-shaped, and its width and height are approximately constant in the extension direction. Although the cross section of the first tapered portion 51b formed to be continuous with the first straight portion 51a is, for example, square-shaped, the width and height of the first tapered portion 51b decrease toward a termination portion 51ba like a tapered-shape. The first tapered portion 51b has a length L23 (see FIG. 6). The first core portion 51 is made of silica-based glass which is doped with a refractive-index-increasing material similar to that of the first core portion 51. The relative refractive-index difference of the first core portion 51 relative to the cladding portion 40 is, for example, 2.5% to 12%, and more preferably 4% to 12%.

Similarly to the second core portion 32 of the spot-size conversion optical waveguide 100, the second core portion 52 has a straight-portion-coating portion 52a, a tapered-portion-coating portion 52b, a second tapered portion 52d expanding in width and height toward the direction D2, a second straight portion 52e, and a coupling portion 52c coupling the tapered-portion-coating portion 52b to the second tapered portion 52d. However, a portion corresponding to the side portion 32aa of the second core portion 32 is not formed in the second core portion 52. The second core portion 52 is made of silica-based glass which is doped with refractive-index-increasing material similar to that of the second core portion 32. The relative refractive-index difference of the second core portion 52 relative to the cladding portion 40 is, for example, 0.3% to 1.8%.

The straight-portion-coating portion 52a is formed to cover the first straight portion 51a of the first core portion 51 from above. Although the height of the straight-portion-coating portion 52a is fixed along the direction D2, the height may decrease gradually toward an opposite side of the direction D2 similarly to the straight-portion-coating portion 32a in Embodiment 1. The tapered-portion-coating portion 52b is formed to be continuous with the straight-portion-coating portion 52a and to cover the first tapered portion 51b of the first core portion 51. The width and height of the tapered-portion-coating portion 52b decrease like a tapered-shape along the shape of the first tapered portion 51b. The tapered-portion-coating portion 52b has a length which is at least equal to or longer than the length L23 of the first tapered portion 51b (see FIG. 6). A termination portion 52ba corresponding to the termination portion 51ba of the first tapered portion 51b is formed at the termination portion of the tapered-portion-coating portion 52b. The second tapered portion 52d increases in width and height toward the direction D2 like a tapered-shape. The second tapered portion 52d has a length L24 (see FIG. 6). The termination portion 51ba of the first tapered portion 51b is separated from the second tapered portion 52d by a distance L25.

The second straight portion 52e is formed to be continuous with the second tapered portion 52d. A cross section at a plane which is orthogonal to the direction D2 is, for example, square-shaped, and width and height thereof are approximately constant in the direction D2. A light-outputting surface 52ea is formed at an end portion of the second straight portion 52e. The second straight portion 52e has a length L21 (see FIG. 6). The light-outputting surface 52ea is disposed on a plane that is the same as the end surface 200a of the spot-size conversion optical waveguide 200. The light-outputting surface 52ea is square-shaped of which length of one side is, for example, a length L22 (see FIG. 5). The coupling portion 52c expands to a side portion of the tapered-portion-coating portion 52b and a side of the second tapered portion 52d.

Figure 7A:
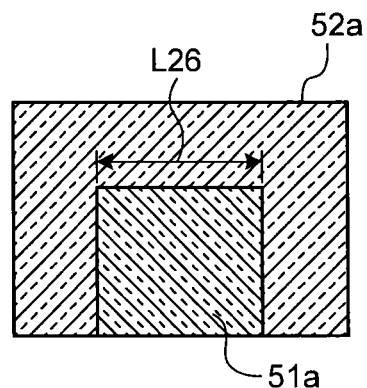
FIG. 7A is a view showing surfaces of the first core portion and the second core portion at a cross section viewed from line D-D shown in FIG. 5.
Figure 7B:
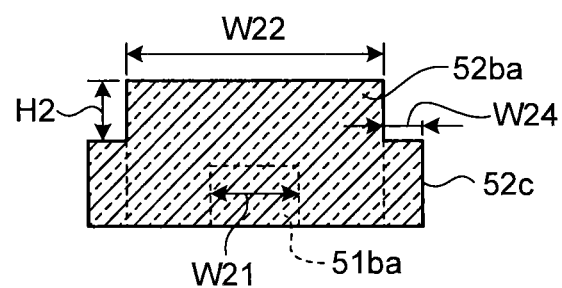
FIG. 7B is a view showing the first core portion and the second core portion at a cross section viewed from line E-E shown in FIG. 5.
Figure 7C:
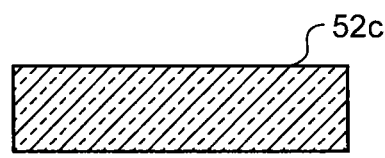
FIG. 7C is a view showing surfaces of the first core portion and the second core portion at a cross section viewed from line F-F shown in FIG. 5.

FIGS. 7A, 7B, and 7C are views showing cross sections of the first core portion 51 and the second core portion 52 at cross sections viewed from lines D-D, E-E, and F-F shown in FIG. 5 respectively. As shown in FIG. 7A, an end portion of the first straight portion 51a of the first core portion 51 appears at the cross section viewed from line D-D. Regarding the second core portion 52, the straight-portion-coating portion 52a formed to cover the first straight portion 51a appears. The first straight portion 51a has a square-shaped cross section of which length of one side is a length L26.

As shown in FIG. 5 as well, the width and height of the square of the first tapered portion 51b of the first core portion 51 decrease toward the termination portion 51ba from the cross section viewed from line D-D to the cross section viewed from line E-E. The width and height of the tapered-portion-coating portion 52b of the second core portion 52 decrease along the shape of the first tapered portion 51b. As shown in FIG. 7B, regarding the second core portion 52, the termination portion 52ba of the tapered-portion-coating portion 52b and the coupling portion 52c appear in the cross section viewed from line E-E. Since the termination portion 51ba of the first tapered portion 51b is positioned at a side of the cross section viewed from line D-D relative to the cross section viewed from line E-E, the first core portion 51 is indicated by a broken line. The termination portion 51ba has a width W21. The termination portion 52ba has a width W22. The termination portion 52ba is formed as a gap H2 to the coupling portion 52c. The coupling portion 52c is wider than the tapered-portion-coating portion 52b by a width W24. The width W24 increases in its value from the cross section viewed from line D-D to the cross section viewed from line E-E. It is preferable that the width W24 be 0 μm to 2 μm.

As shown in FIG. 5 as well, the first core portion 51 does not exist from the cross section viewed from line E-E to the cross section viewed from line F-F, and the coupling portion 52c of the second core portion 52 extends in the direction D2 so as to have a rectangular cross-sectional shape. As shown in FIG. 7C, only the coupling portion 52c of the second core portion 52 appears in the cross section viewed from line F-F.

Similarly to the spot-size conversion optical waveguide 100 according to Embodiment 1, an optical fiber is disposed in the spot-size conversion optical waveguide 200 as well according to the present Embodiment 2 so that the optical waveguide circuit is connected to a side of the first straight portion 51a of the first core portion 51 and an end surface faces the light-outputting surface 52ea which is on a plane that is the same as the end surface 200a of the spot-size conversion optical waveguide 200.

When an optical signal having a predetermined wavelength is input from the optical waveguide circuit's side to the first core portion 51, the signal light, while being propagated through the core portion 50, is transmitted from the first tapered portion 51b to the coupling portion 52c of the second core portion 52 via the tapered-portion-coating portion 52b, and the optical signal is expanded in its spot size by the second tapered portion 52d and output from the light-outputting surface 52ea of the second straight portion 52e, and then, the optical signal is subjected to optical coupling to the optical fiber at a low connection loss.

Embodiment 3

Figure 8:
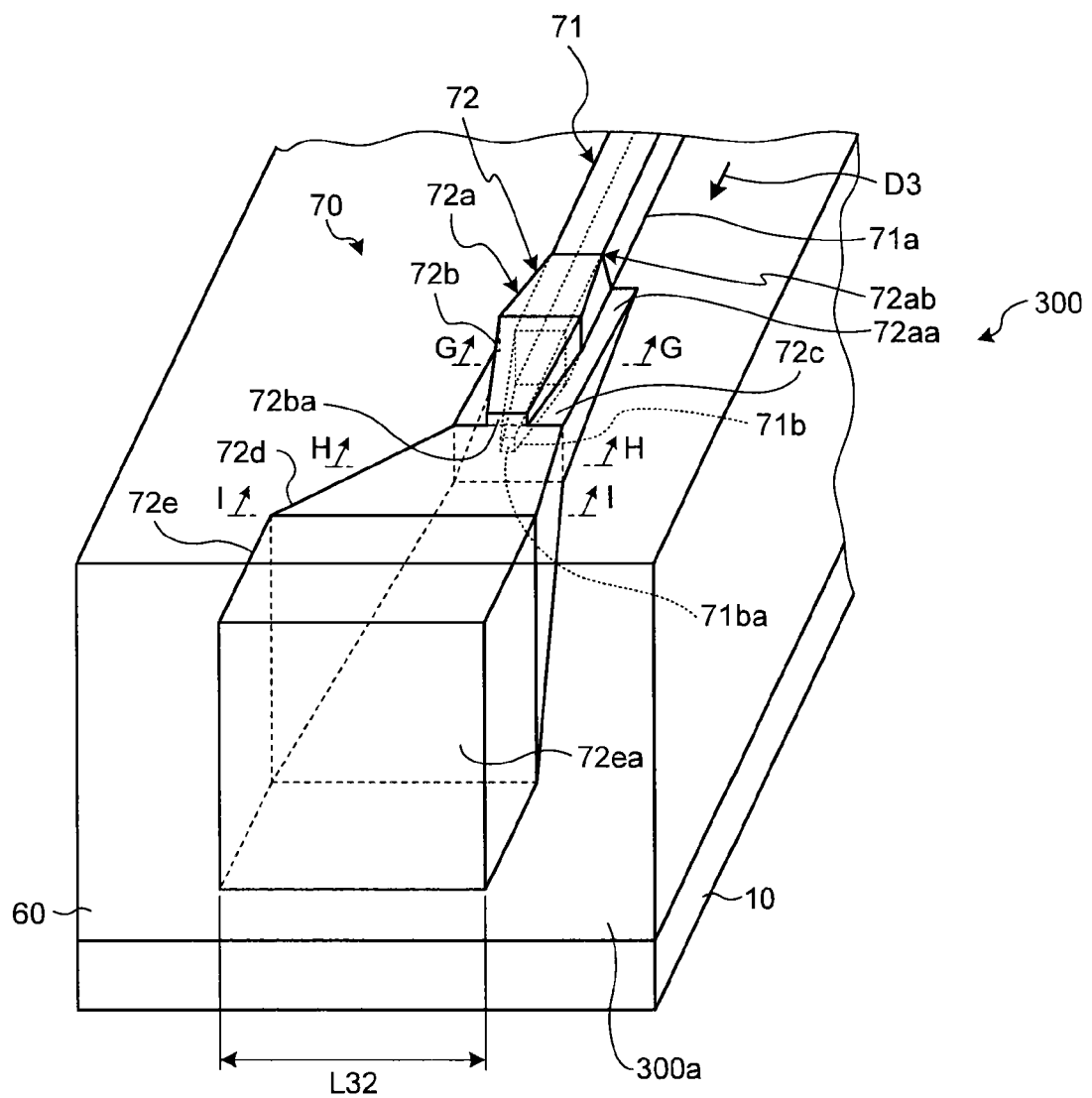
FIG. 8 is a schematic perspective view of a spot-size conversion optical waveguide according to Embodiment 3.
Figure 9:
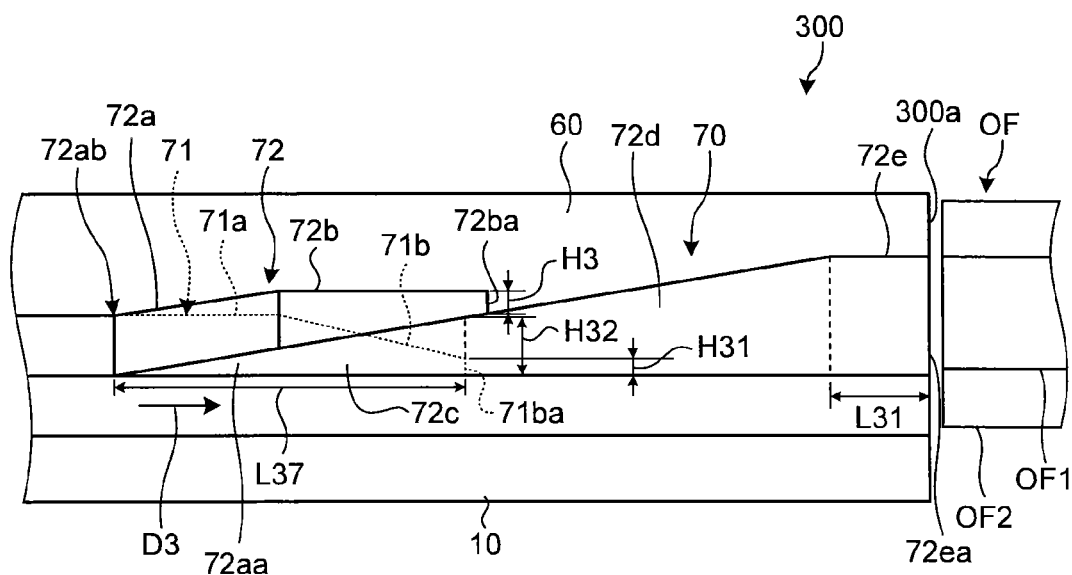
FIG. 9 is a schematic side view of the spot-size conversion optical waveguide shown in FIG. 8.
Figure 10:
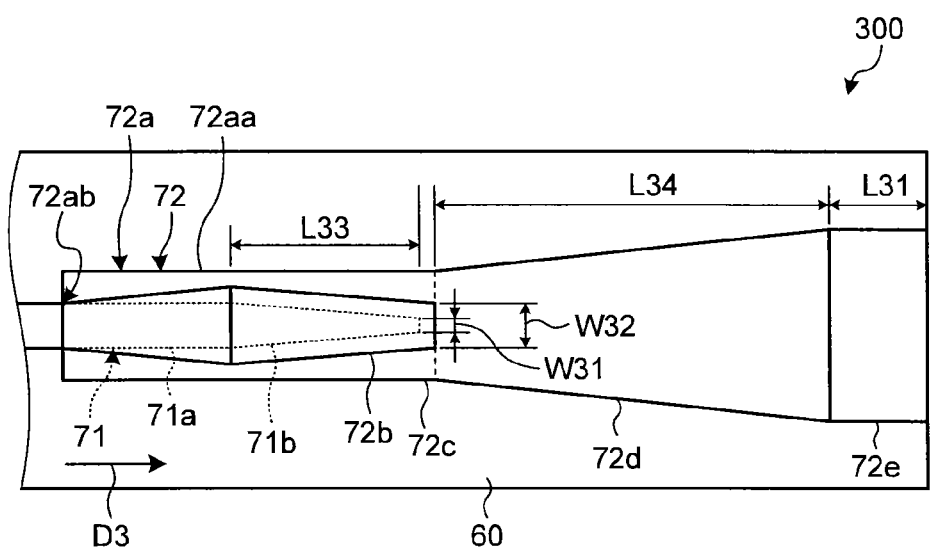
FIG. 10 is a schematic plan view of the spot-size conversion optical waveguide shown in FIG. 8.

FIG. 8 is a schematic perspective view of a spot-size conversion optical waveguide according to Embodiment 3 of the present invention. FIG. 9 is a schematic side view of the spot-size conversion optical waveguide shown in FIG. 8. FIG. 10 is a schematic plan view of the spot-size conversion optical waveguide shown in FIG. 8. As shown in FIGS. 8 to 10, a spot-size conversion optical waveguide 300 according to present Embodiment 3 has a substrate 10, a cladding portion 60 formed on the substrate 10, and a core portion 70 disposed in the cladding portion 60. The core portion 70 extends in a direction D3.

The substrate 10 is the same as the substrate 10 of the spot-size conversion optical waveguide 100 according to Embodiment 1. The cladding portion 60 is made of silica-based glass which is doped with oxide, for example, boron (B), phosphor (P) or the like similarly to the cladding portion 20 of the spot-size conversion optical waveguide 100.

The core portion 70 is made of silica-based glass of which refractive index is set to be higher than that of the cladding portion 60 similarly to the core portion 30 of the spot-size conversion optical waveguide 100. The core portion 70 has a first core portion 71 and a second core portion 72 of which refractive index is lower than that of the first core portion 71.

The first core portion 71 has a first straight portion 71a and a first tapered portion 71b similarly to the first core portion 31 of the spot-size conversion optical waveguide 100. The first straight portion 71a extends in the direction D3 (extension direction). A cross section of the first straight portion 71a in a plane which is orthogonal to the extension direction is, for example, square-shaped, and its width and height are approximately constant in the extension direction. The first tapered portion 71b is formed to be continuous with the first straight portion 71a, and a cross section of the first tapered portion 71b is, for example, square-shaped. The first tapered portion 71b decreases in its width and height toward a termination portion 71ba like a tapered-shape. The first tapered portion 71b has a length L33 (see FIG. 10). The first core portion 71 is made of silica-based glass which is doped with refractive-index-increasing material similar to that of the first core portion 31. The relative refractive-index difference of the first core portion 71 relative to the cladding portion 60 is, for example, 2.5% to 12%, and more preferably 4% to 12%.

Similarly to the second core portion 32 of the spot-size conversion optical waveguide 100, the second core portion 72 has a straight-portion-coating portion 72a, a tapered-portion-coating portion 72b, a second tapered portion 72d expanding in width and height toward the direction D3, a second straight portion 72e, and a coupling portion 72c coupling the tapered-portion-coating portion 72b to the second tapered portion 72d. Moreover, the second core portion 72 has a side portion 72aa expanding in a width direction of the straight-portion-coating portion 72a. The second core portion 72 is made of silica-based glass which is doped with refractive-index-increasing material similar to that of the second core portion 32. The relative refractive-index difference of the second core portion 72 relative to the cladding portion 60 is, for example, 0.3% to 1.8%.

The straight-portion-coating portion 72a is formed to cover the first straight portion 71a of the first core portion 71 from thereabove. The height and width of the straight-portion-coating portion 72a decrease gradually toward an opposite side of the direction D3. The straight-portion-coating portion 72a has a second termination portion 72ab at a position where the height and width of the straight-portion-coating portion 72a coincide with those of the first straight portion 71a of the first core portion 71 and where the straight-portion-coating portion 72a, covering the first core portion 71, of the second core portion 72 ends (see FIG. 9). A length L37 shown in FIG. 9 is a length of an overlapping portion which is a length from the termination portion 71ba of the first core portion 71 to the second termination portion 72ab. Although the position where the straight-portion-coating portion 72a ends varies at an upper surface and a side surface of the first straight portion 71a sometimes, the length L37 of the overlapping portion is defined as a length from the second termination portion 72ab, at which the straight-portion-coating portion 72a ends on the upper surface of the first straight portion 71a, to the termination portion 71ba of the first core portion 71.

The tapered-portion-coating portion 72b is formed to be continuous from the straight-portion-coating portion 72a and to cover the first tapered portion 71b of the first core portion 71, and the width of the tapered-portion-coating portion 72b decreases in a tapered-shape along the shape of the first tapered portion 71b. The tapered-portion-coating portion 72b has a length which is at least equal to or longer than a length L33 of the first tapered portion 71b (see FIG. 10). A termination portion 72ba corresponding to the termination portion 71ba of the first tapered portion 71b is formed at a termination portion of the tapered-portion-coating portion 72b. The second tapered portion 72d expands in width and height in a tapered-shape toward the direction D3. In this state, a height H32 of the second tapered portion 72d at a position of the termination portion 71ba of the first tapered portion 71b is higher than a height H31 of the termination portion 71ba of the first tapered portion 71b. The second tapered portion 72d has a length L34 (see FIG. 10). The termination portion 72ba of the tapered-portion-coating portion 72b and an end portion, at a side of the tapered-portion-coating portion 72b, of the second tapered portion 72d are formed to coincide approximately with each other.

The second straight portion 72e is formed to be continuous with the second tapered portion 72d. A cross section at a plane which is orthogonal to the direction D3 is, for example, square-shaped, and width and height thereof are approximately constant in the direction D3. A light-outputting surface 72ea is formed at an end portion of the second straight portion 72e. The second straight portion 72e has a length L31 (see FIG. 10). The light-outputting surface 72ea is disposed on a plane that is the same as the end surface 300a of the spot-size conversion optical waveguide 300. The light-outputting surface 72ea is square-shaped of which length of one side is, for example, a length L32 (see FIG. 8). The coupling portion 72c expands at a side portion of the tapered-portion-coating portion 72b. In the spot-size conversion optical waveguide 300 according to present Embodiment 3, the coupling portion 72c is formed to connect an interval between the side portion 72aa and the second tapered portion 72d.

Figure 11A:
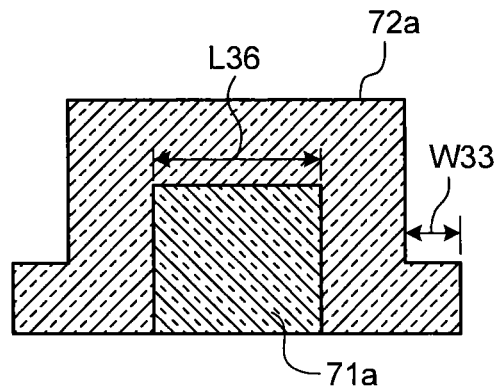
FIG. 11A is a view showing surfaces of the first core portion and the second core portion at a cross section viewed from line G-G shown in FIG. 8.
Figure 11B:
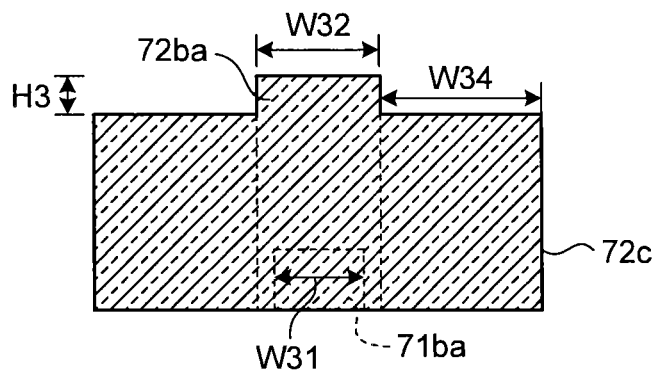
FIG. 11B is a view showing surfaces of the first core portion and the second core portion at a cross section viewed from line H-H shown in FIG. 8.
Figure 11C:
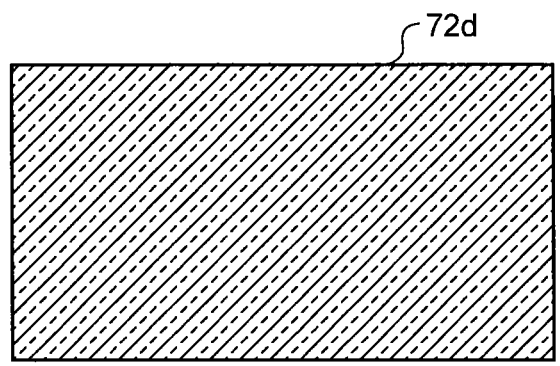
FIG. 11C is a view showing surfaces of the first core portion and the second core portion at a cross section viewed from line I-I shown in FIG. 8.

FIGS. 11A, 11B, and 11C are views showing surfaces of cross sections of the first core portion 71 and the second core portion 72 at cross sectional views taken from lines G-G, H-H, and I-I shown in FIG. 8 respectively. As shown in FIG. 11A, an end portion of the first straight portion 71a of the first core portion 71 appears at the cross section viewed from line G-G. The straight-portion-coating portion 72a, of the second core portion 72, formed to cover the first straight portion 71a, and the side portion 72aa expanding in the width direction of the straight-portion-coating portion 72a appear. The first straight portion 71a has a square-shaped cross section of which length of one side is length L36. The side portion 72aa has a width W33.

From the cross section viewed from line G-G to the cross section viewed from line H-H, as shown in FIG. 8, the width and height of the square of the first tapered portion 71b of the first core portion 71 decrease toward the termination portion 71ba. The width of the tapered-portion-coating portion 72b of the second core portion 72 decreases along the shape of the first tapered portion 71b. As shown in FIG. 11B, regarding the second core portion 72, the termination portion 72ba of the tapered-portion-coating portion 72b and the coupling portion 72c appear at the cross section viewed from line H-H. The first core portion 71 is indicated by a broken line since the termination portion 71ba of the first tapered portion 71b is positioned at a side of the cross section viewed from line G-G relative to the cross section viewed from line H-H. The termination portion 71ba has a width W31. The termination portion 72ba has a width W32. The termination portion 72ba is formed as a gap H3 to the coupling portion 72c. The coupling portion 72c is wider than the tapered-portion-coating portion 72b by a width W34. The width W34 increases in its value from the cross section viewed from line G-G to the cross section viewed from line H-H. It is preferable that the width W34 be 0 μm to 2 μm.

From the cross section viewed from line H-H to the cross section viewed from line I-I, as shown in FIG. 8 as well, the first core portion 71 does not exist, and the second tapered portion 72d of the second core portion 72 increases in width and height toward the second straight portion 72e. As shown in FIG. 11C, only the second tapered portion 72d of the second core portion 72 appears at the cross section viewed from line I-I.

In the cross section viewed from line G-G, the widths of the side portion 72aa and the second straight portion 32e may be adjusted so that the width W33 is zero and only the straight-portion-coating portion 72a appears. In this state, the side portion 72aa has a shape which increases in height and decreases in width toward the direction D3 in tapered-shape from the second termination portion 72ab.

Similarly to the spot-size conversion optical waveguide 100 according to Embodiment 1, an optical fiber having the core portion OF1 and the cladding portion OF2 similarly to the Embodiment 1 is disposed in the spot-size conversion optical waveguide 300 as well according to the present Embodiment 3 so that the optical waveguide circuit is connected to a side of the first straight portion 71a of the first core portion 71 and an end surface faces the light-outputting surface 72ea which is on a plane that is the same as the end surface 300a of the spot-size conversion optical waveguide 300 similarly to Embodiment 1.

When an optical signal having a predetermined wavelength is input from the optical waveguide circuit's side to the first core portion 71, the signal light, while being propagated through the core portion 70, is transmitted from the first tapered portion 71b to the tapered-portion-coating portion 72b and the coupling portion 72c, and the optical signal is expanded in its spot size by the second tapered portion 72d and output from the light-outputting surface 72ea of the second straight portion 72e, and then, the optical signal is subjected to optical coupling to the optical fiber OF with low connection loss.

(Preferable Dimensions of Elements)

Hereafter, preferable dimensions of elements constituting the spot-size conversion optical waveguides 100, 200, 300 according to Embodiments 1, 2, and 3 will be explained.

To start with, the length of one side of L12 will be explained which is preferable for the light-outputting surface 32ea when making the spot-size conversion optical waveguide 100 be subjected to optical connection with the above-described standard single-mode optical fiber.

Figure 12:
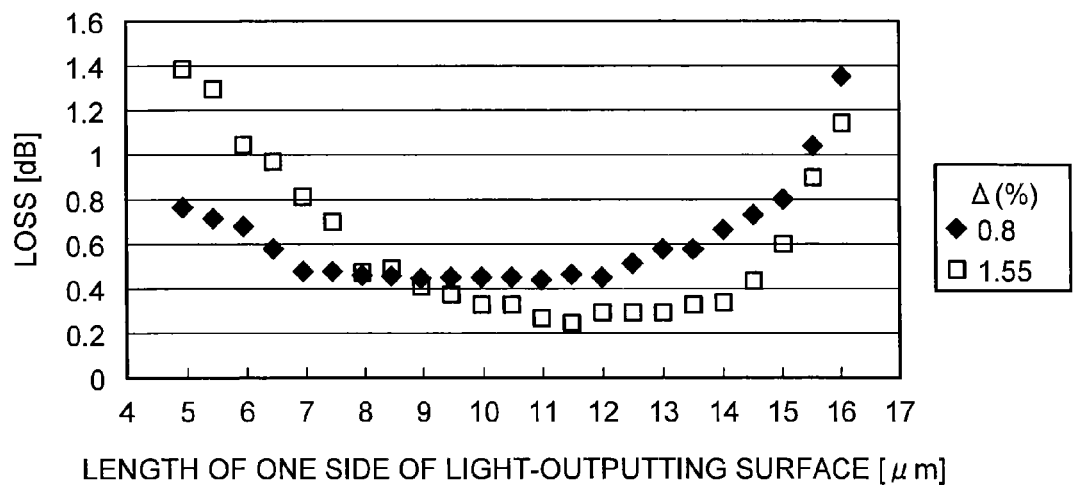
FIG. 12 is a view showing a relationship between length of one side, at a light-outputting surface, of the second core portion and loss.

FIG. 12 is a view showing a relationship between the length L12 of one side at the light-outputting surface 32ea of the second core portion 32 and loss in a case of connecting the spot-size conversion optical waveguide 100 to a standard single-mode optical fiber. Herein, in FIGS. 12 to 18, the loss is obtained by adding propagation loss at the spot-size conversion optical waveguide 100 to connection loss at the spot-size conversion optical waveguide 100 and the standard single-mode optical fiber. FIG. 12 also shows a result of calculation when the relative refractive-index difference Δ of the second core portion 32 relative to the cladding portion 20 is set at 0.8% or 1.55%. The wavelength of the light is 1550 nm. The relative refractive-index difference of the first core portion 31 is 5%, the length L16 of one side of the first straight portion 31a is, for example, 3 μm, and at these values, the light is propagated in a single mode at the wavelength of 1550 nm. Data points are plotted at an interval of 0.5 μm.

As shown in FIG. 12, if the length L12 of one side of the light-outputting surface 32ea is 8 µm to 14 µm, a loss can be restrained in a case of connection with the standard single-mode optical fiber at, for example, not greater than approximately 0.6 dB. Although FIG. 12 shows a case where the relative refractive-index difference Δ is 0.8% and 1.55%, it is preferable that the relative refractive-index difference Δ be within a range of 0.3% to 1.8% since a loss in case of connection with the standard single-mode optical fiber can be restrained by making the length L12 be 8 µm to 14 µm. This range of 8 µm to 14 µm is a preferable range even if this range is applied to the length L22 of one side of the light-outputting surface 52ea of the spot-size conversion optical waveguide 200 or the length L32 of one side of the light-outputting surface 72ea of the spot-size conversion optical waveguide 300.

A value will be explained which is preferable for the distance L15 (inter-tapered-portion distance) as a distance between the termination portion 31ba of the first tapered portion 31b and the second tapered portion 32d when the spot-size conversion optical waveguide 100 is subjected to optical connection with the standard single-mode optical fiber.

Figure 13:
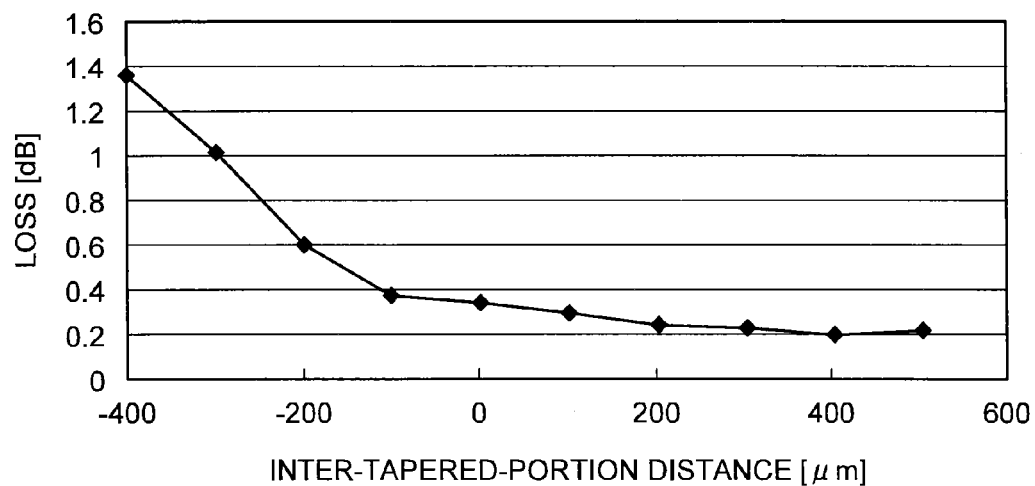
FIG. 13 is a view showing a relationship between an inter-tapered-portion distance and loss.

FIG. 13 is a view showing a relationship between the distance L15 as the inter-tapered-portion distance and loss in a case of connecting the spot-size conversion optical waveguide 100 to the standard single-mode optical fiber. In FIG. 13, the inter-tapered-portion distance indicated by a horizontal axis is in positive value in a case where the second tapered portion 32d is separated in the direction D1 relative to the termination portion 31ba, and is in negative value in a case where the second tapered portion 32d is separated in a direction opposite to the direction D1. FIG. 13 also shows a result of calculation when the relative refractive-index difference of the second core portion 32 relative to the cladding portion 20 is set at 1.55%. The wavelength of the light is 1550 nm. The relative refractive-index difference of the first core portion 31 is 5%, the length L16 of one side of the first straight portion 31a is, for example, 3 µm, and at these values, the light is propagated in a single mode at the wavelength of 1550 nm. The length L13 of the first tapered portion 31b is 500 µm. The length L14 of the second tapered portion 32d is 1000 µm. The length L12 of one side of the light-outputting surface 32ea is 12 µm. Data points are plotted at an interval of 100 µm.

As shown in FIG. 13, it is preferable that the distance L15 as the inter-tapered-portion distance be equal to or greater than −100 µm since a loss in a case of connection with the standard single-mode optical fiber decreases rapidly, and equal to or greater than 0 µm is more preferable. The distance L15 is sufficient to be equal to or less than 500 µm. It is preferable that the distance L15 be approximately 0 µm since a decrease in loss and a decrease in size of the spot-size conversion optical waveguide 100 in the direction D1 can be achieved compatibly. This range of equal to or greater than −100 µm, equal to or greater than 0 µm, or equal to or less than 500 µm is also preferable to be applied to the distance L25 of the spot-size conversion optical waveguide 200.

Hereafter a height of the gap H1 will be explained which is preferable when the spot-size conversion optical waveguide 100 is subjected to optical connection with the standard single-mode optical fiber.

Figure 14:
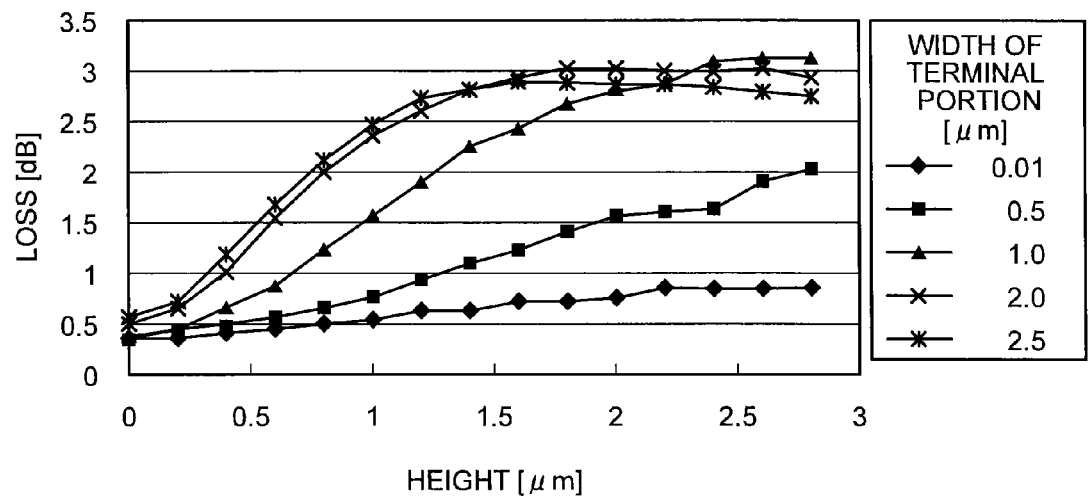
FIG. 14 is a view showing a relationship between height of a gap and loss in a case where Δ of the second core portion is 0.8%.
Figure 15:
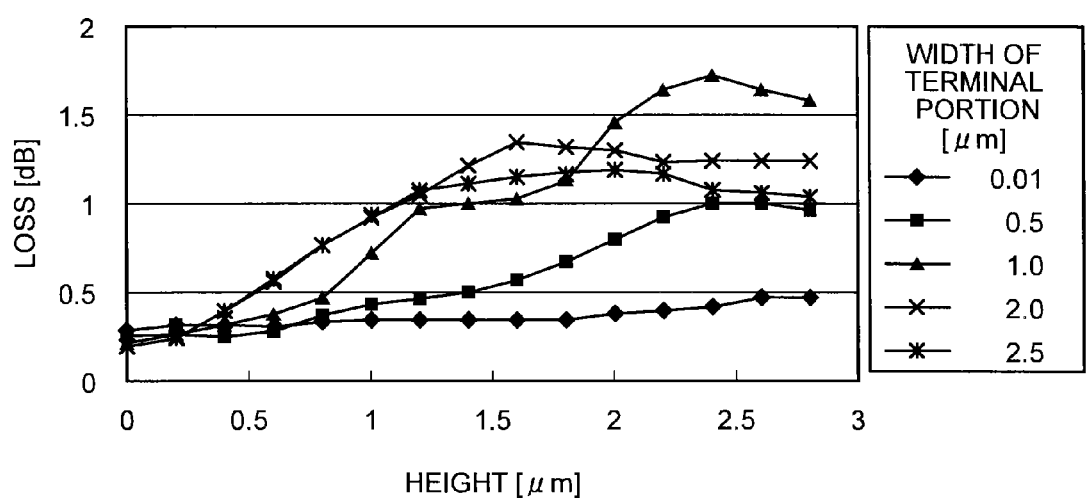
FIG. 15 is a view showing a relationship between height of a gap and loss in a case where Δ of the second core portion is 1.55%.

FIGS. 14 and 15 are views showing a relationship between the height of the gap H1 and loss in a case where the spot-size conversion optical waveguide 100 is connected to the standard single-mode optical fiber. FIGS. 14 and 15 show a result of calculation when the relative refractive-index difference Δ of the second core portion 32 relative to the cladding portion 20 is set at 0.8% and 1.55% respectively. The wavelength of the light is 1550 nm. The relative refractive-index difference of the first core portion 31 is 5%, the length L16 of one side of the first straight portion 31a is, for example, 3 µm, and at these values, the light is propagated in a single mode at the wavelength of 1550 nm. The length L13 of the first tapered portion 31b is 500 µm. The length L14 of the second tapered portion 32d is 1000 µm. The length L12 of one side of the light-outputting surface 32ea is 12 µm. The length L15 is 0 µm. The width W11 of the termination portion 31ba of the first tapered portion 31b is set at 0.01 µm, 0.5 µm, 1.0 µm, 2.0 µm, or 2.5 µm. Data points are plotted at an interval of 0.2 µm.

As shown in FIGS. 14 and 15, loss can be lowered by decreasing the height of the gap H1. The loss can be lowered also by narrowing a termination portion width. Moreover, the loss in a case of FIG. 15 where the relative refractive-index difference Δ of the second core portion 32 relative to the cladding portion 20 is 1.55% is lower than in a case of FIG. 14 where the relative refractive-index difference Δ is 0.8%. It is preferable that the height of the gap H1 be within a range of greater than 0 µm and equal to or less than 2 µm and the width W11 be equal to or smaller than 1 µm. It is preferable that a cross-section indicated as a product of a value of the gap H1 and a value of the width W11 be equal to or greater than 0.5 µm². The ranges of the gap H1 and the width W11 are ranges that are preferable to be applied to the gap H2 and the width W21 of the spot-size conversion optical waveguide 200, or to the gap H3 and the width W31 of the spot-size conversion optical waveguide 300.

Hereafter, the length L13 of the first tapered portion 31b will be explained which is preferable when making the spot-size conversion optical waveguide 100 be subjected to optical connection with the standard single-mode optical fiber.

Figure 16:
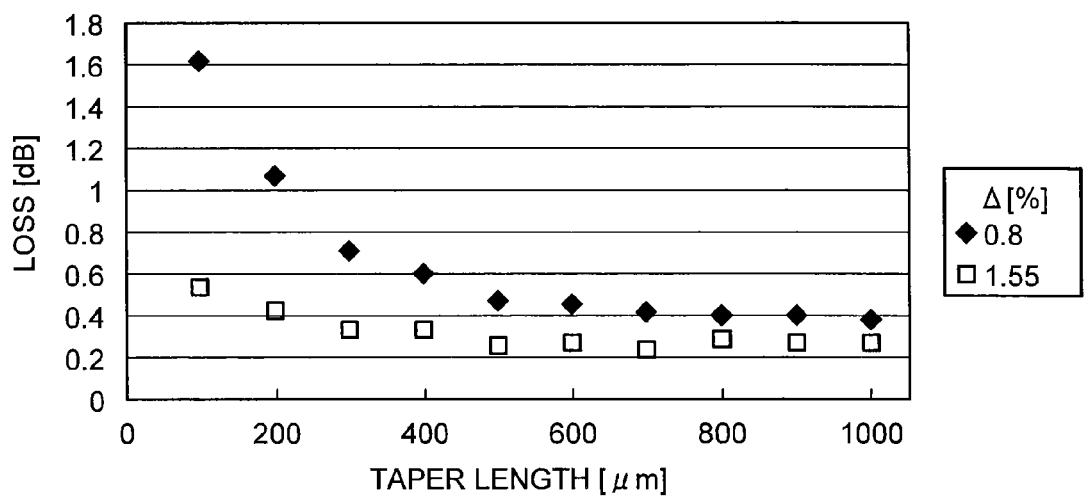
FIG. 16 is a view showing relationship between length of the first tapered portion and loss.

FIG. 16 is a view showing a relationship between the length L13 (taper length) and a loss in a case of connecting the spot-size conversion optical waveguide 100 with the standard single-mode optical fiber. FIG. 16 shows a result of calculation when the relative refractive-index difference Δ of the second core portion 32 relative to the cladding portion 20 is set at 0.8% or 1.55%. The wavelength of the light is 1550 nm. The relative refractive-index difference of the first core portion 31 is 5%, the length L16 of one side of the first straight portion 31a is 3 µm, and at these values, the light is propagated in a single mode at the wavelength of 1550 nm. The length L14 of the second tapered portion 32d is 1000 µm. The length L12 of one side of the light-outputting surface 32ea is 12 µm. The distance L15 is 0 µm. Data points are plotted at an interval of 100 µm.

As shown in FIG. 16, if the length L13 is preferably equal to or longer than 300 µm, or equal to or longer than 400 µm more preferably, a loss in a case of connection to the standard single-mode optical fiber can be restrained at, for example, not greater than approximately 0.6 dB. Although FIG. 16 shows a case where the relative refractive-index difference Δ is 0.8% and 1.55%, if the relative refractive-index difference Δ is within a range of 0.3% to 1.8%, a loss in a case of connection with the standard single-mode optical fiber can be restrained by making the length L13 equal to or longer than 300 µm preferably, or equal to or longer than 400 µm more preferably. The range of equal to or longer than 300 µm or equal to or longer than 400 µm is a range that is preferable to be applied to the length L23 of the first tapered portion 51b of the spot-size conversion optical waveguide 200 or the length L33 of the first tapered portion 71b of the spot-size conversion optical waveguide 300.

Hereafter the length L14, of the second tapered portion 32d, which is preferable when making the spot-size conversion optical waveguide 100 be subjected to optical connection with the standard single-mode optical fiber will be explained.

Figure 17:
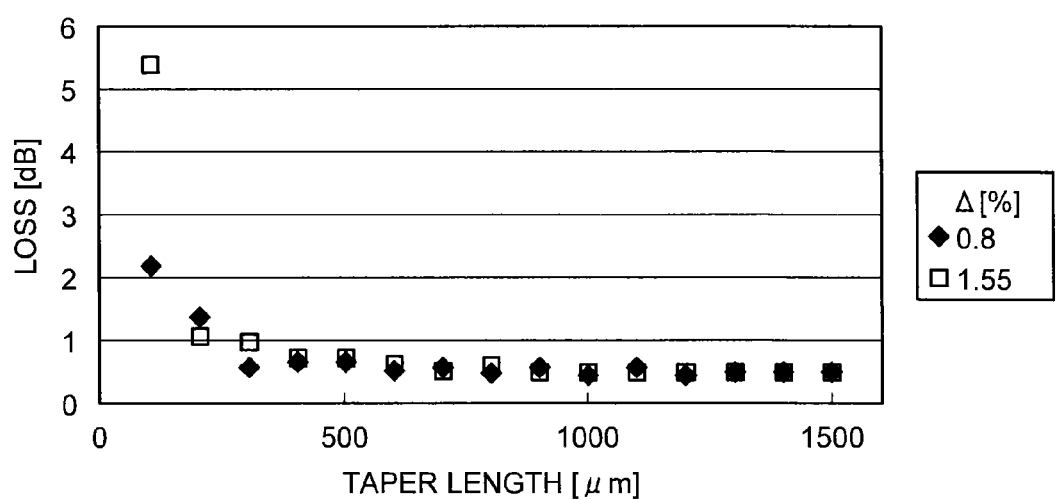
FIG. 17 is a view showing relationship between length of the second tapered portion and loss.

FIG. 17 is a view showing relationship between the length L14 (taper length) and loss in a case where the spot-size conversion optical waveguide 100 is connected to the standard single-mode optical fiber. FIG. 17 shows the result of calculation when the relative refractive-index difference Δ of the second core portion 32 relative to the cladding portion 20 was set at 0.8% or 1.55%. The wavelength of the light is 1550 nm. The relative refractive-index difference of the first core portion 31 is 5%, the length L16 of one side of the first straight portion 31a is 3 μm, and at these values, the light is propagated in a single mode at the wavelength of 1550 nm. The length L13 of the first tapered portion 31b is 500 μm. The length L12 of one side of the light-outputting surface 32ea is 12 μm. The distance L15 is 0 μm. Data points are plotted at an interval of 100 μm.

As shown in FIG. 17, if the length L14 is equal to or longer than 200 μm preferably, and equal to or longer than 300 μm more preferably, the loss in a case of connection with the standard single-mode optical fiber can be restrained to, for example, not greater than approximately 0.6 dB. Although FIG. 17 shows a case where the relative refractive-index difference Δ is 0.8% and 1.55%, if the relative refractive-index difference Δ is within a range of 0.3% to 1.8%, a loss in a case of connection with the standard single-mode optical fiber can be restrained by making the length L14 equal to or longer than 200 μm preferably, or equal to or longer than 300 μm more preferably. The range of equal to or longer than 200 μm or equal to or longer than 300 μm is a range that is preferable to be applied to the length L24 of the second tapered portion 52d of the spot-size conversion optical waveguide 200 or the length L34 of the second tapered portion 72d of the spot-size conversion optical waveguide 300.

Hereafter the length L37, of the overlapping portion, which is preferable when making the spot-size conversion optical waveguide 300 be subjected to optical connection with the standard single-mode optical fiber will be explained. It is because, in a case of forming the second tapered portion 72d by using a shadow mask like a production method which will be explained later, the length L37 of the overlapping portion may be shifted from a designed value due to a shift of a position where the shadow mask is fixed in a longitudinal direction of a waveguide.

Figure 18:
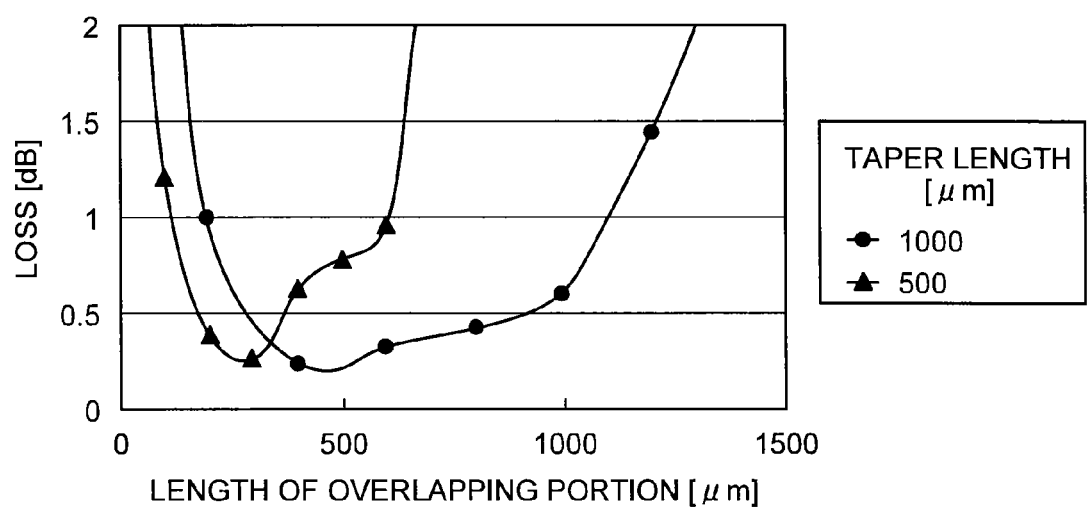
FIG. 18 is a view showing relationship between length of an overlapping portion and loss.

FIG. 18 is a view showing relationship between the length L37 of the overlapping portion and loss in a case where the spot-size conversion optical waveguide 300 is connected to the standard single-mode optical fiber. FIG. 18 shows the result of calculation when the length L34 (taper length) of the second tapered portion 72d is set at 500 μm or 1000 μm. FIG. 18 shows the result of calculation when the relative refractive-index difference Δ of the second core portion 72 relative to the cladding portion 60 was set at 1.55%. The wavelength of the light is 1550 nm. The relative refractive-index difference of the first core portion 71 is 5%, the length L36 of one side of the first straight portion 71a is 3 μm, and at these values, the light is propagated in a single mode at the wavelength of 1550 nm. The length L33 of the first tapered portion 71b is 500 μm. The length L32 of one side of the light-outputting surface 72ea is 12 μm. Data points are plotted at an interval of 100 μm when the length L34 is 500 μm, and data points are plotted at an interval of 200 μm when the length L34 is 1000 μm.

As shown in FIG. 18, if the length L37 of the overlapping portion is preferably equal to or longer than 250 μm and equal to or less than 350 μm when the length L34 is 500 μm, a loss can be restrained in a case of connection with the standard single-mode optical fiber at, for example, not greater than approximately 0.5 dB. That is, a reduced loss can be maintained even if the length L37 of the overlapping portion is shifted within a range of 100 μm. Then, if the length L37 of the overlapping portion is preferably equal to or longer than 300 μm and equal to or less than 900 μm when the length L34 is 1000 μm, a loss can be restrained in a case of connection with the standard single-mode optical fiber at, for example, not greater than approximately 0.5 dB. That is, a reduced loss can be maintained even if the length L37 of the overlapping portion is shifted within a range of 600 μm.

From the result of this calculation, when the length L34 of the second tapered portion 72d is longer, the range which is capable of maintaining a reduced loss relative to shifting of the length L37 of the overlapping portion is wider. Therefore, it is preferable that the length L34 of the second tapered portion 72d be equal to or larger than 500 μm, and it is more preferable that the length L34 of the second tapered portion 72d be equal to or longer than 1000 μm. This range of equal to or larger than 500 μm or equal to or longer than 1000 μm is a preferable range even if this range is applied to the length L14 of the second tapered portion 32d of the spot-size conversion optical waveguide 100 or the length L24 of the second tapered portion 52d of the spot-size conversion optical waveguide 200.

(Production Method)

Figure 19A:
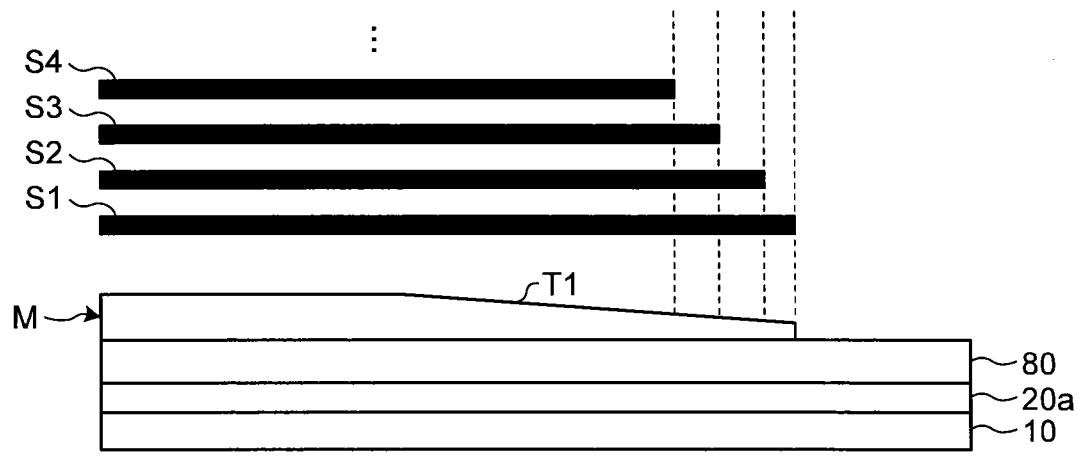
FIG. 19A is a view for explaining an example of a production method for the spot-size conversion optical waveguide according to Embodiment 1.

Hereafter, an example of the production method of the spot-size conversion optical waveguide 100 according to Embodiment 1 will be explained. The spot-size conversion optical waveguide 200 according to Embodiment 2 and the spot-size conversion optical waveguide 300 according to Embodiment 3 can be produced by the similar method. FIGS. 19A to 19C, and FIG. 20 are views for explaining one example of the production method of the spot-size conversion optical waveguide according to Embodiment 1. To start with, as shown in FIG. 19A, particles of silica-based glass are deposited on the substrate 10 by a commonly known Flame Hydrolysis Deposition (FHD) method, and this is heated to become transparent vitrified glass to form a lower portion layer 20a constituting a lower portion of the cladding portion 20. Then, a silica-based glass particle layer 80 which becomes the first core portion 31 is deposited on the lower portion layer 20a by plasma chemical vapor deposition (CVD) method. Then, a mask M made of metal or photoresist is formed on the silica-based glass particle layer 80. The mask M has a tapered portion T1 of which thickness decreases gradually.

The mask M having the tapered portion T1 as such is formed as follows for example. To start with, a resist is applied on the silica-based glass particle layer 80. Then, when exposing the resist, exposures are conducted by a plurality of times while changing an exposure area gradually. For example, FIG. 19A shows exposure areas S1, S2, S3, and S4 . . . . The exposure areas S1, S2, S3, and S4 are exposure areas for the first time, second time, third time, and the fourth time respectively. The exposure amount for one time of exposure is made lower than the appropriate exposure amount for the resist to be used, and the exposure for one time of exposure is set to be underexposure.

By conducting underexposure by a plurality of times while changing the exposure area gradually, the mask M can be obtained in which the tapered portion T1, of which thickness increases where multiple exposures are conducted more times, is formed. In order to smooth an inclination of the tapered portion T1, there is a method in which a width of change when changing the exposure area gradually is made be equal to or lower than an accuracy for masking an apparatus determining the exposure area. Hereby, even if the exposure area is changed discretely, the tapered portion T1 can be formed with a smooth inclination.

Figure 19B:
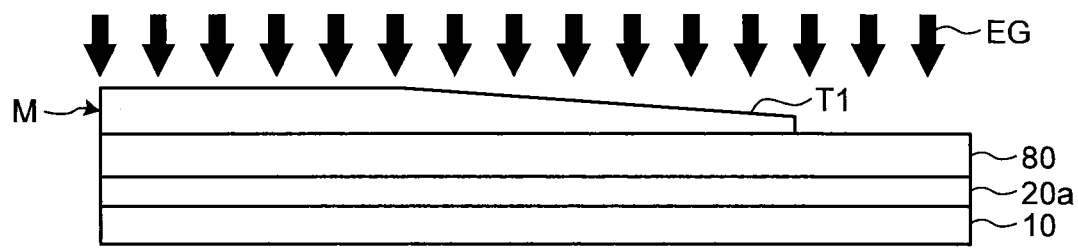
FIG. 19B is a view for explaining an example of the production method for the spot-size conversion optical waveguide according to Embodiment 1.
Figure 19C:
FIG. 19C is a view for explaining an example of the production method for the spot-size conversion optical waveguide according to Embodiment 1.

Then, as shown in FIG. 19B, a dry-etching is conducted to the silica-based glass particle layer 80 by using, for example, fluorine-based gas (for example, $CF_4$ or the like) and the mask M as an etching mask. Hereby, as shown in FIG. 19C, a silica-based glass particle layer 80A having a tapered portion T2 to which a shape of the mask M having the tapered portion T1 is transcribed is formed. Then, after removing the mask M, the silica-based glass particle layer 80A is patterned to a shape of the first core portion 31 by photolithographic technique and etching.

Figure 20:
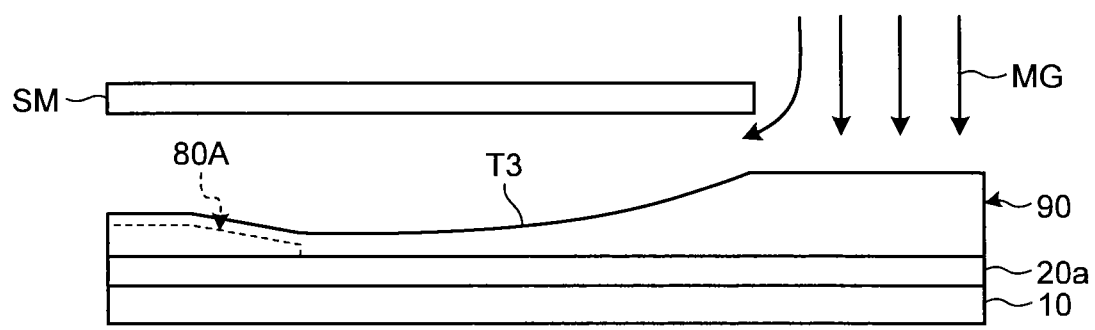
FIG. 20 is a view for explaining an example of the production method for the spot-size conversion optical waveguide according to Embodiment 1.

Then, as shown in FIG. 20, a shadow mask SM is disposed on the lower portion layer 20a on which the silica-based glass particle layer 80A is formed. Then, a material gas MG for depositing the silica-based glass particles is fed from above the shadow mask SM by FHD method, plasma CVD method, spattering method or the like. Then, the material gas MG is blocked at an area covered with the shadow mask SM, and reaches above the lower portion layer 20a at an area not covered with the shadow mask SM in this state. Herein the area not covered with the shadow mask SM includes an area immediately below a hole formed in the shadow mask SM and an area at an outer periphery of the shadow mask SM. Although the material gas MG comes around a lower side of the shadow mask SM to reach above the lower portion layer 20a at a peripheral area of the hole and the outer periphery of the shadow mask SM, the amount of the coming-around material gas MG decreases where is farther from the outer periphery of the shadow mask SM. As a result, as shown in FIG. 20, a silica-based glass particle layer 90 is formed which has a tapered portion T3 of which thickness is fixed at the area not covered with the shadow mask SM but decreases in a tapered-shape toward the area covered with the shadow mask SM. In this state, in order to form the straight-portion-coating portion 32a and the tapered-portion-coating portion 32b, the silica-based glass particle layer 90 is formed so that an end portion of the silica-based glass particle layer 90 covers the silica-based glass particle layer 80A. The shape of the silica-based glass particle layer 90 can be adjusted by setting a height of the shadow mask SM from the lower portion layer 20a and a position of a peripheral portion of the shadow mask SM. After that, after removing the shadow mask SM, the silica-based glass particle layer 90 is patterned in a shape of the second core portion 32 by photolithographic technique and etching.

Herein, when patterning the shape of the second core portion 32, the side portion 32aa expanding in the width direction of the straight-portion-coating portion 32a is formed (see FIGS. 1 and 4). Hereby, even if there is an error in shape and position of the patterning, since it is possible to make the area of the side portion 32aa absorb the error, it is possible to prevent the error from affecting the size of the straight-portion-coating portion 32a. It is preferable that the width W13 of the side portion 32aa be greater than 0 μm to be set in accordance with a predictable error of the patterning and may be equal to or less than 2 μm.

Then, silica-based glass particles for forming the rest of the portion of the cladding portion 20 are deposited again by FHD method. After that, the whole substrate is heated to make each of the silica-based glass particles become transparent glass to finish the cladding portion 20 and the core portion 30. After that, the spot-size conversion optical waveguide 100 is completed by cutting the substrate into a desirable shape.

When the end surface 100a of the spot-size conversion optical waveguide 100 is formed by cutting, an error occurs at the position of the cutting sometimes. Herein, if it is attempted to cut the second tapered portion 32d of the second core portion 32, an area of the end surface of the second tapered portion 32d exposed from the end surface 100a may vary in accordance with error in position. As a result, spot sizes of signal lights outputted from the end surface 100a of the spot-size conversion optical waveguide 100 may vary due to difference occurring in production.

In contrast, it is preferable since the second straight portion 32e having the length L11 exists in the spot-size conversion optical waveguide 100 according to present Embodiment 1, and thus the area of the light-outputting surface 32ea of the second straight portion 32e exposing from the end surface 100a hardly varies even if there is an error in the cutting, and the signal light with a stable spot size can be outputted. In consideration of the width of a dicer being approximately 100 μm, it is preferable that the length L11 be equal to or longer than 200 μm.

In the above-described Embodiments, if a material, with which the first core portion is doped for increasing refractive index thereof, takes longer time for depositing a glass particle layer relative to a case of doping with Ge or has difficulty in etching relative to the case of doping with Ge, it is difficult to achieve a lower connection loss by using a spot-size conversion optical waveguide made of only the first core portion and by processing the shape of the first core portion. However, the spot-size conversion optical waveguide according to the above-described Embodiment achieves a lower connection loss by forming a predetermined shape of the second core portion doped with a material such as Ge, which is relatively easy to deposit, to etch and to process. As described above, the present invention is especially effective in a case where a material (for example, Zr) is doped which causes difficulty in processing the shape of the first core portion.

In the above Embodiments, the cross section of the first core portion and the cross section and the light-outputting surface of the second straight portion of the second core portion are square-shaped but may be set in accordance with a shape of an object to be subjected to optical connection, therefore, any shape other than square such as rectangle or trapezoid may be used.

As described above, the spot-size conversion optical waveguide according to the present invention is suitable for use mainly in a field of optical communication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A spot-size-converting optical waveguide comprising:
   a cladding portion; and
   a core portion disposed in the cladding portion, a refractive index of the core portion being higher than a refractive index of the cladding portion, wherein
   the core portion includes a first core portion and a second core portion,
   the first core portion has a first straight portion and a first tapered portion,
   the first straight portion extends in a predetermined direction and has width and height that are approximately constant in the extension direction, and the first tapered portion is formed to be continuous with the first straight portion and decreases in width and height toward a termination portion,
   the second core portion has a straight-portion-coating portion, a tapered-portion-coating portion, and a second tapered portion, the straight-portion-coating portion is formed to cover the first straight portion of the first core portion, the tapered-portion-coating portion is formed to cover the first tapered portion of the first core portion continuously with the straight-portion-coating portion and decreases in width and height along a shape of the first tapered portion, and the second tapered portion increases in width and height toward the extension direction, a light-outputting surface is formed at an end portion of the second core portion, and a refractive index of the second core portion is lower than a refractive index of the first core portion.

2. The spot-size-converting optical waveguide according to claim 1, wherein a relative refractive-index difference of the first core portion relative to the cladding portion is 2.5% to 12%, and a relative refractive-index difference of the second core portion relative to the cladding portion is 0.3% to 1.8%.

3. The spot-size-converting optical waveguide according to claim 1, wherein the light-outputting surface of the second core portion is rectangular-shaped of which length of one side is 8 μm to 14 μm.

4. The spot-size-converting optical waveguide according to claim 1, wherein the width and height of the tapered-portion-coating portion of the second core portion are greater than the width and height of the first tapered portion of the first core portion and make the predetermined wavelength of light propagate in a single-mode.

5. The spot-size-converting optical waveguide according to claim 1, wherein the second core portion has a side portion expanding in a width direction of the straight-portion-coating portion, and a width of the side portion is greater than 0 μm and equal to or less than 2 μm.

6. The spot-size-converting optical waveguide according to claim 1, wherein the second core portion has a coupling portion coupling the tapered-portion-coating portion to the second tapered portion, and a width of the coupling portion is greater than a width of the tapered-portion-coating portion by 0 μm to 2 μm.

7. The spot-size-converting optical waveguide according to claim 1, wherein the second core portion has a coupling portion coupling the tapered-portion-coating portion to the second tapered portion, a termination portion of the tapered-portion-coating portion of the second core portion forms a gap to the coupling portion, and a height of the gap is greater than 0 μm.

8. The spot-size-converting optical waveguide according to claim 1, wherein a separation distance from the termination portion of the first tapered portion to the second tapered portion is greater than −100 μm where the extension direction is a positive direction.

9. The spot-size-converting optical waveguide according to claim 1, wherein a length of the first tapered portion is equal to or longer than 300 μm.

10. The spot-size-converting optical waveguide according to claim 1, wherein a length of the second tapered portion is equal to or longer than 200 μm.

11. The spot-size-converting optical waveguide according to claim 1, wherein the second core portion further has a second straight portion formed to be continuous with the second tapered portion, width and height of the second straight portion are approximately constant in the extension direction, and a light-outputting surface is formed at an end portion of the second straight portion.

\* \* \* \* \*